(12) United States Patent
Allison et al.

(10) Patent No.: US 7,105,069 B2
(45) Date of Patent: Sep. 12, 2006

(54) SOUND ABSORBING/SOUND BLOCKING AUTOMOTIVE TRIM PRODUCTS

(75) Inventors: Timothy J. Allison, Old Fort, NC (US); Carroll L. Owenby, Old Fort, NC (US); Ernie Wilson, Albemarle, NC (US); Ronnie Lash, Marion, NC (US)

(73) Assignee: Collins & Aikman Products Co., Southfield, MI (US)

( * ) Notice: Subject to any disclaimer, the term of this patent is extended or adjusted under 35 U.S.C. 154(b) by 95 days.

(21) Appl. No.: 10/851,686

(22) Filed: May 21, 2004

(65) Prior Publication Data

US 2005/0064779 A1    Mar. 24, 2005

Related U.S. Application Data

(63) Continuation-in-part of application No. 10/253,373, filed on Sep. 24, 2002, now Pat. No. 6,821,366.

(60) Provisional application No. 60/333,594, filed on Nov. 26, 2001.

(51) Int. Cl.
| | |
|---|---|
| A47G 27/02 | (2006.01) |
| B32B 3/10 | (2006.01) |
| B32B 31/16 | (2006.01) |

(52) U.S. Cl. .............. 156/72; 156/285; 156/309.9; 264/101; 428/95; 428/96

(58) Field of Classification Search ............ None
See application file for complete search history.

(56) References Cited

U.S. PATENT DOCUMENTS

| | | | |
|---|---|---|---|
| 3,645,948 A | 2/1972 | Stahl | 260/28.5 |
| 3,673,034 A | 6/1972 | Squier | |
| 4,016,318 A | 4/1977 | DiGioia et al. | 428/95 |
| 4,191,798 A | 3/1980 | Schumacher et al. | 428/95 |
| 4,242,395 A | 12/1980 | Zuckerman et al. | 428/96 |
| 4,335,034 A | 6/1982 | Zukerman et al. | 524/23 |
| 4,367,259 A | 1/1983 | Fulmer et al. | 428/240 |
| 4,508,771 A | 4/1985 | Peoples, Jr. et al. | 428/95 |
| 4,529,639 A | 7/1985 | Peoples et al. | 428/95 |
| 4,563,378 A | 1/1986 | Roth | 428/86 |
| 4,576,853 A | 3/1986 | Vaughn et al. | 428/181 |
| 4,579,764 A | 4/1986 | Peoples, Jr. et al. | 428/95 |
| 4,845,133 A * | 7/1989 | Priester, Jr. et al. | 521/167 |
| 4,851,283 A | 7/1989 | Holtrop et al. | 428/284 |
| 4,966,799 A | 10/1990 | Lucca et al. | 428/95 |
| 5,071,608 A | 12/1991 | Smith et al. | 264/119 |
| 5,086,082 A * | 2/1992 | Stone | 521/107 |
| 5,256,224 A | 10/1993 | Gillyns et al. | 156/72 |

(Continued)

FOREIGN PATENT DOCUMENTS

DE         2006741 B2    2/1970

(Continued)

*Primary Examiner*—Sam Chuan Yao
(74) *Attorney, Agent, or Firm*—Grossman, Tucker, Perreault & Pfleger, PLLC

(57) ABSTRACT

Sound absorbing/sound blocking products, including trim products formed from a porous fibrous layer backed by a sound absorbing layer and a sound blocking layer for use within vehicles, and methods of making same, are provided. A porous fibrous layer structure including a fibrous layer backing is heated to achieve a fluid or semi-fluid state and then subjected to vacuum to draw air through the fibrous layer backing to create a porous structure. A layer of sound absorbing and a layer of sound blocking material may be applied to the porous fibrous layer backing to provide improved acoustic properties. An underlayment may further be included to provide selected areas of increased thickness and provide tailoring of sound attenuation.

22 Claims, 7 Drawing Sheets

U.S. PATENT DOCUMENTS

| | | | |
|---|---|---|---|
| 5,283,097 A | 2/1994 | Gillyns et al. | 428/91 |
| 5,298,694 A | 3/1994 | Thompson et al. | 181/286 |
| 5,439,725 A | 8/1995 | Roberts | 428/95 |
| 5,476,711 A | 12/1995 | Hebbard et al. | 428/283 |
| 5,498,667 A | 3/1996 | David et al. | 525/166 |
| 5,534,145 A | 7/1996 | Boyles et al. | 210/90 |
| 5,578,648 A | 11/1996 | Beyer et al. | 521/45.5 |
| 5,591,802 A | 1/1997 | David et al. | 525/66 |
| 5,677,027 A | 10/1997 | Masuda et al. | 428/96 |
| 5,749,993 A | 5/1998 | Denney et al. | 156/214 |
| 5,817,408 A | 10/1998 | Orimo et al. | 428/218 |
| 5,876,826 A | 3/1999 | Hoffmann et al. | 428/95 |
| 5,958,548 A | 9/1999 | Negola et al. | 428/92 |
| 6,329,039 B1 | 12/2001 | Rossignoli | 428/95 |
| 6,548,141 B1 | 4/2003 | Nagata et al. | 428/95 |
| 6,631,785 B1 | 10/2003 | Khambete et al. | 181/290 |
| 2002/0134486 A1* | 9/2002 | Brumbelow et al. | 156/79 |
| 2003/0096079 A1 | 5/2003 | Messina et al. | 428/85 |
| 2003/0099810 A1 | 5/2003 | Allison et al. | 428/95 |
| 2004/0026556 A1* | 2/2004 | Kish | 242/380 |

FOREIGN PATENT DOCUMENTS

| | | |
|---|---|---|
| EP | 255332 A2 * | 3/1988 |
| JP | 58183330 A2 | 10/1983 |

\* cited by examiner

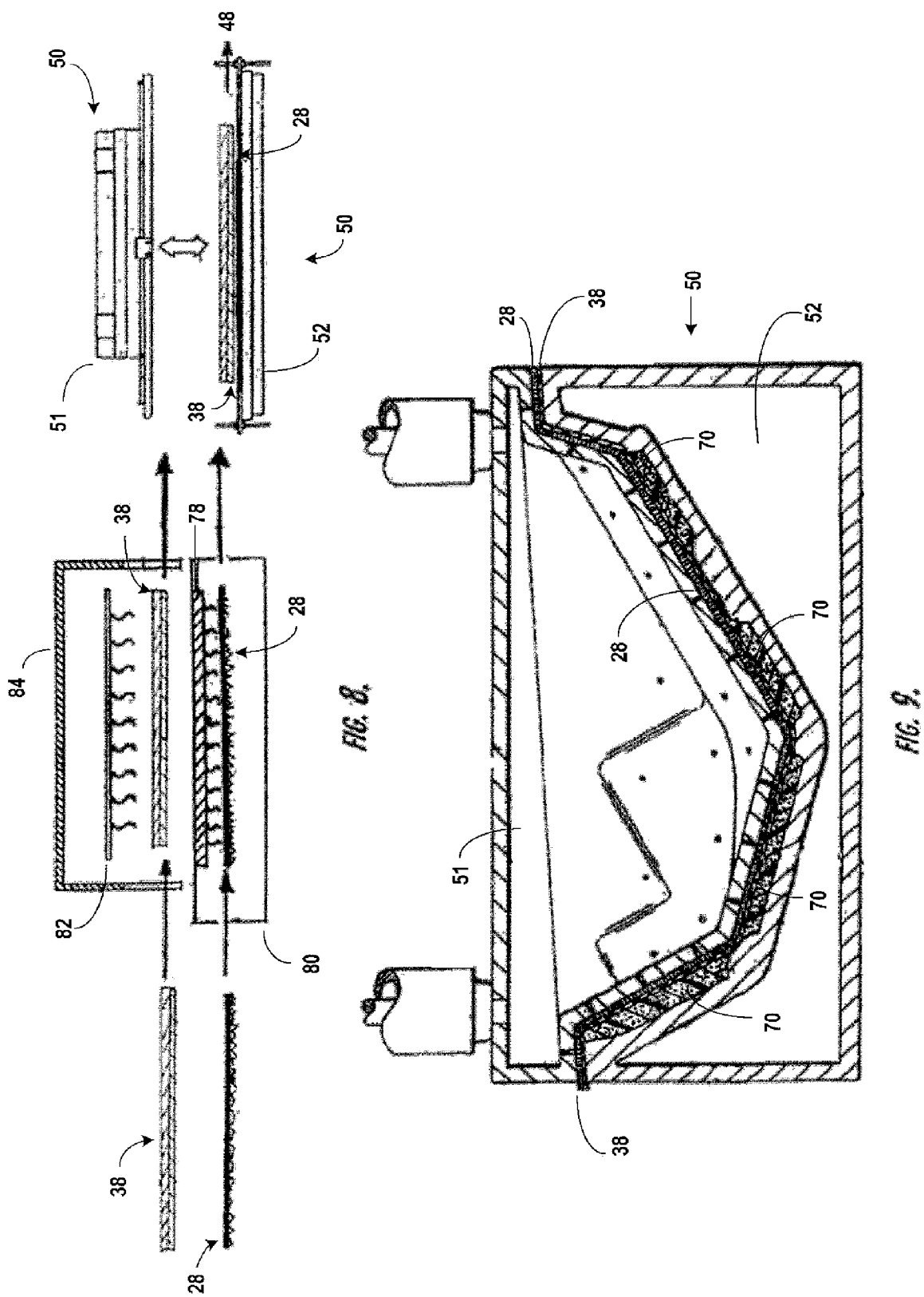

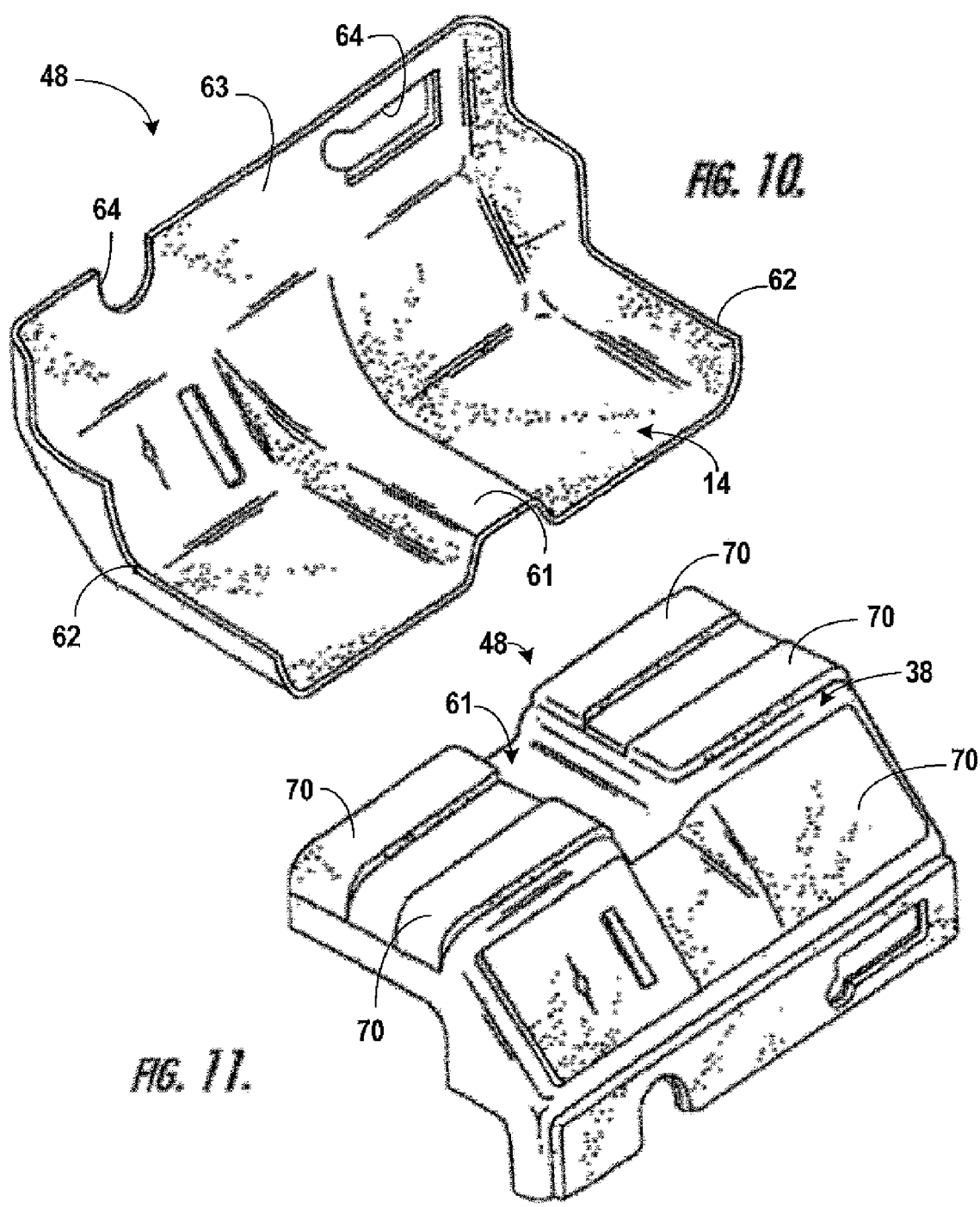

SOUND ABSORBING/SOUND BLOCKING AUTOMOTIVE TRIM PRODUCTS

CROSS-REFERENCE TO RELATED APPLICATIONS

This application is a continuation-in-part of U.S. application Ser. No. 10/253,373, now U.S. Pat. No. 6,821,366 filed Sep. 24, 2002, entitled "Porous Carpeting For Vehicles And Methods Of Producing Same", which claims the benefit of U.S. Provisional Application No. 60/333,594 filed Nov. 26, 2001.

TECHNICAL FIELD

The present invention relates generally to vehicles and, particularly, to methods of producing automotive trim products having exceptional sound attenuating properties, which may further include the ability to absorb and/or block sound.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in dashboards, in conjunction with carpeting for floor panels, in wheel wells, in trunk compartments, under hoods, as part of headliners, etc.

The attenuation of external noise (i.e., noise emanating from a source external to a vehicle compartment) is conventionally referred to as sound transmission loss (STL). The attenuation of internal noise (i.e., noise emanating from within a vehicle compartment) is conventionally referred to as sound absorption. The acoustic impedance of a material is defined as material density times acoustic velocity, and is expressed in units of Rayls (Newton-seconds/meter.sup.3). Acoustic impedance defines how easy it is for air to move through a material. Thus, for fibrous materials, acoustic impedance may depend upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's collective STL, acoustic impedance, and absorption characteristics. In some cases it may be desirable to block noise, say from entering the passenger compartment from outside. In these cases a higher density layer of material may be used.

Carpeting for use within vehicles is conventionally tufted or non-woven. Tufted carpet generally includes a composite structure in which tufts, or bundles of carpet fibers are introduced (such as by stitching) into a primary backing, such as a woven or non-woven fabric. A secondary backing or coating of thermoplastic material is then applied to the underside of the carpet construction in order to securely retain the tufted material in the primary backing. This secondary backing not only dimensionally stabilizes the construction but may also provide greater abrasion and wear resistance, and may serve as an adhesive for an additional layer of material. Nonwoven carpet may be composed of fiber that is mechanically entangled by needling, water jet, or other processes.

Vehicle carpeting is conventionally molded into a non-planar three dimensional contoured configuration which conforms to the contours of a vehicle floor. A secondary coating of thermoplastic material applied to the primary backing may also make the carpeting moldable and shape-retaining, and may also serve as a barrier to improve the sound attenuating properties of the carpeting. The use of fibrous materials, woven, non-woven, tufted, etc. is no longer limited to the floor of the vehicle as carpeting but may be used in the trunk area, in cargo areas in SUV's, on a package shelf or even on interior trim.

Conventional vehicle carpeting typically includes an ethylene-vinyl acetate (EVA), polyethylene (PE), or polyvinyl-chloride (PVC) layer which serves as a barrier sheet. Unfortunately, there are several drawbacks associated with the use of EVA, PE, and PVC layers in these vehicle applications. For example, EVA, PE, and PVC are non-porous materials which can be relatively heavy when applied to carpeting, dash insulators, and other interior trim components.

Various sound attenuating materials have been developed for use in reducing noise levels within passenger compartments of vehicles. For example, U.S. Pat. No. 4,851,283 to Holtrop et al., proposes a thermoformable laminate for use in headliners. The headliner comprises a non-woven fabric bonded to a foamed polymer sheet. The fabric is formed from a blend of low melting staple fibers and high melting staple fibers.

U.S. Pat. No. 5,298,694 to Thompson proposes a non-woven acoustical insulation web. The web comprises thermoplastic fibers, and particularly a blend of melt-blown microfibers and crimped bulking fibers.

U.S. Pat. No. 5,677,027 to Masuda et al. proposes a sound insulating structure comprising a covering layer, a panel, and a cushioning layer. The cushioning layer comprises a first fiber such as polyethylene terephthalate (PET) and a second fiber that is of a shell-core construction wherein the majority of the core is PET.

U.S. Pat. No. 5,817,408 to Orimo et al. proposes a sound insulating structure which includes low and high density thermoplastic fibers. PET is preferred as a thermoplastic synthetic fiber.

U.S. Pat. No. 4,529,639 to Peoples, Jr. et al. proposes a molded foam-backed carpet assembly which includes a carpet layer, a moldable thermoplastic polymer layer and one or more foam pads fusibly bonded to the thermoplastic layer and extending over less than the entire surface of the thermoplastic polymer layer to provide desired cushioning and sound and thermal insulation only in preselected areas of the carpet.

In general, the ability of conventional materials used in vehicles to attenuate sound increases as the amount of material increases. Accordingly, there is a continuing need for materials for use within vehicles that exhibit good sound attenuating properties, including the ability to block sound and which may be tailored to conform to local geometry and acoustic requirements. This tailoring may include the use of various materials, preferably fibrous, disposed as multiple layers some of which may be sound absorbing and others acting as a barrier. The layers may further be provided only in local areas to match the location of the source of the noise or may cover the backside of the outer fibrous material layer. Further, there is a need to provide these materials formed into complex shapes which may find use anywhere in the vehicle and which may by their composition be self-supporting.

SUMMARY OF THE INVENTION

In view of the above discussion, automotive trim products comprising porous fibrous materials, such as carpet, backed by a sound reducing layer and including a sound blocking layer, and methods of producing such are provided. According to embodiments of the present invention a primary layer of thermoplastic fibrous material (woven or non-woven) is first provided. The primary layer has opposite first and second sides, preferably with fibers (e.g., yarn tufts, etc.) extending outwardly from the first side. A secondary backing layer of molten thermoplastic material (e.g., polyethylene, ethylene vinyl acetate, etc.) is applied to the second side of the primary layer such that the secondary backing layer penetrates the primary layer up to about 90% of a thickness of the primary layer and forms a carpet backing. The carpet backing is then heated to a temperature sufficient to cause the carpet backing to achieve a fluid state. The heated carpet backing is then subjected to sufficient vacuum such that air is drawn through the heated carpet backing to create a porous carpet structure. A layer of porous thermoformable material may then be applied to the carpet backing to form a first composite.

A second composite containing a sound reducing layer is then formed. The first and second composites may be heated and placed together into a mold and formed to shape to provide an automotive trim panel having both tailored geometry and tailored acoustical performance. The term "sound reducing layer" is therefore defined as including any material which might absorb, attenuate, insulate, or serve as a barrier to sound. The sound reducing layer herein may also include two or more layers of material, e.g. one being a sound absorber, one being a sound barrier (or "sound blocking layer"). The term "sound blocking layer" is therefore defined as any material which might block the direct path of sound between a source and a receiver.

According to embodiments of the present invention, the layer of porous thermoformable material applied to the porous carpet backing to form a first composite may hold the porous carpet backing open such that air may flow therethrough and may help maintain the porosity of the first composite during reheating and molding by preventing the thermoplastic from forming a film, as well as providing additional mechanical strength. The layer of porous thermoformable material may be fibrous material comprising natural fibers, man-made fibers, waste fibers and blends of thereof. The layer of porous thermoformable material may also be a sound reducing layer of fibrous or foam material which is adhered to or poured directly against the carpet backing. In some instances, the foam may penetrate the carpet backing somewhat and act as a barrier. This sound reducing layer may optionally be localized rather than providing full coverage behind the carpet backing layer.

According to embodiments of the present invention, a second composite may be formed comprising sound absorbing layer and sound blocking layers. The second composite may be applied to the backside of the layer of porous thermoformable material of the first composite in a compression mold to tune the acoustical performance of a trim product to preferably match the sources of noise. The second composite preferably comprises a laminate of sound absorbing and sound blocking materials which may provide specific geometry and sound attenuation to specific local areas of the vehicle. Preferably, the second composite comprises sound and/or heat insulators, such as foam, fibrous materials, heavy layer (highly filled) materials, or thermoplastic sheet materials. A third layer of underlayment comprising a fibrous material may be included in the molding process to back the second composite layer. The underlayment layer may act as a decoupler for the product and/or provide local contouring to match a complex surface and leave the top surface of the product smooth.

The automotive trim products of the present invention comprising the molding together to join two or more composites or layers having sound absorbing and sound blocking properties, according to embodiments of the present invention, may provide articles having tailored acoustic and geometry properties to match the area of the vehicle where they may be used. Further, these products may comprise composites which provide self-supporting trim products having a cloth or carpet outer surface and which may be molded into a variety of shapes and attached as outer (show) surfaces of the vehicle in such areas as the interior, trunk, cargo space, engine compartment, etc.

BRIEF DESCRIPTION OF THE DRAWINGS

The accompanying drawings, which form a part of the specification, illustrate embodiments of the present invention. The drawings and description together serve to fully explain the invention.

FIG. 8 is a flow chart of operations to heat the first and second composites prior to forming them into an automotive trim product according to embodiments of the present invention.

FIG. 9 is a cross-sectional view of a mold assembly for forming the first and second composites into the automotive trim products of the present invention.

FIG. 10 is a perspective view of an exemplary automotive trim product for a vehicle according to embodiments of the present invention.

FIG. 11 is a perspective view of the backside of the automotive trim product of FIG. 10 according to embodiments of the present invention.

DETAILED DESCRIPTION OF THE INVENTION

Figure 1:
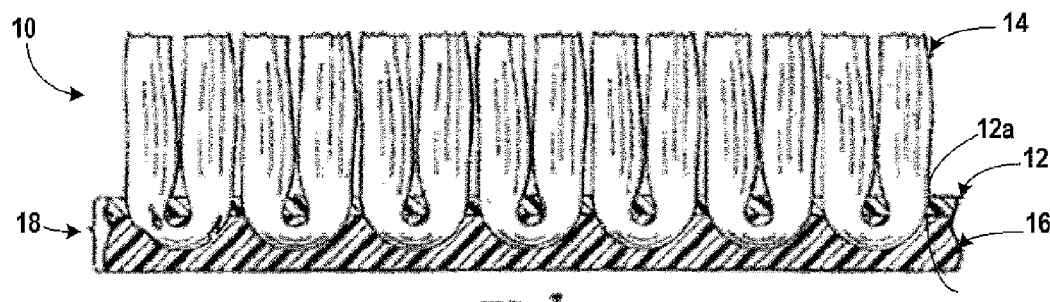
FIG. 1 is a cross-sectional view of a portion of tufted carpet, wherein a secondary layer of thermoplastic material has been added to a primary layer of thermoplastic material to form a carpet backing, according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide automotive trim products for use within vehicles, such as automobiles, and methods of producing same. These trim products, according to embodiments of the present invention are particularly useful for reducing sound produced within a vehicle and for serving as a barrier to sound emanating from sources external to a vehicle. The use of a full sound absorbing layer and a second sound blocking layer further improve acoustic performance and provide an ability to tailor or tune the performance to a specific vehicle geometry or vehicle trim application. Exemplary automotive applications within which trim products, produced according to embodiments of the present invention, may be utilized, include, but are not limited to, floor coverings, trunk liners, spare tire covers, dash liners, package tray trim, engine side absorbers, fender or wheelhouse liners, pillar trim, seat back trim, door or rear gate liners, storage bins, etc. The present invention is not limited to providing porosity within tufted carpeting as non-woven or woven covering surfaces may also be used.

Referring now to FIG. 1, a cross-sectional view of a portion of a covering surface 10, preferably a tufted carpet is illustrated. The tufted carpet includes a primary surface layer 12 of preferably thermoplastic fibrous material having opposite first and second sides 12a, 12b. Yarn tufts 14 extend outwardly from the primary layer first side 12a, as illustrated. The primary surface layer 12 may be a woven matrix of thermoplastic fibrous material or a non-woven matrix of thermoplastic fibrous material (e.g., spunbonded or spunlaced), etc. Fibrous materials from which the primary layer 12 may be formed preferably include any natural or synthetic material. Exemplary thermoplastic fibrous materials from which the primary layer 12 may be formed include, but are not limited to, polyester, nylon, polypropylene, and/or blends thereof, and are available from Freudenburg Spunweb Co., Durham, N.C. and Colbond Geosynthetics, Enka, N.C.

Tufted carpet utilized in accordance with embodiments of the present invention preferably has tuft densities of between about one-eighth gauge and about one-sixteenth gauge. As is known to those skilled in the art, the term "gauge" refers to the number of rows of tufts per unit of measure. For example, one-tenth gauge means that there is a row of tufts every one-tenth of an inch. However, various tuft densities may be utilized. Embodiments of the present invention are not limited to a particular tuft density or to a particular range of tuft densities. The greater the tuft density, the greater the ability to pull air through a carpet such that the material structure of the carpet can be modified, as will be described below.

Typical non-woven carpet for automotive applications range between about 4 and about 30 ounces per square yard, but are not limited to this range. Non-woven carpet may be composed of various fiber types including, but not limited to, polyester, nylon, polypropylene, wool, cotton, and blends thereof.

Figure 2:
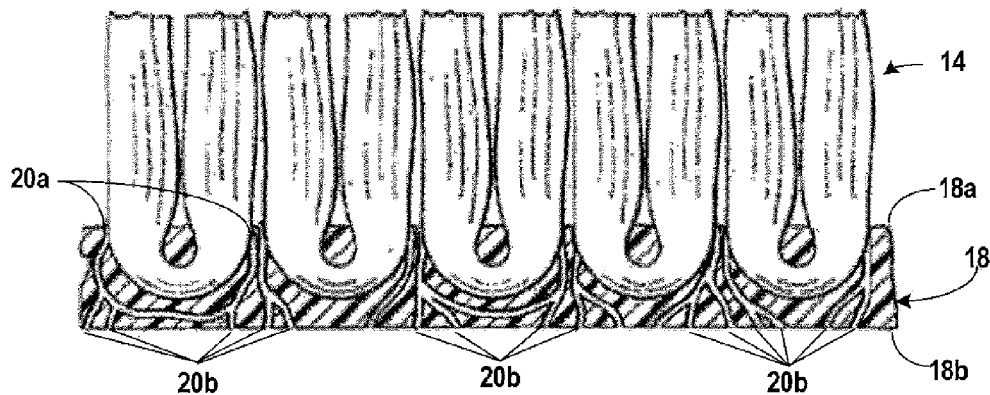
FIG. 2 is an enlarged view of a portion of the carpeting of FIG. 1 illustrating air channels formed within the carpet backing in accordance with embodiments of the present invention.

A secondary backing layer (or precoat) 16 of preferably thermoplastic material is attached to the primary layer second side 12b as illustrated. The secondary layer 16 is attached to the primary layer 12 in a heated condition such as by extrusion coating so that the secondary layer 16 penetrates the primary layer 12 up to about 90% of a thickness of the primary layer 12 and forms a carpet backing, generally referred to as 18. FIG. 2 illustrates the carpet backing 18 as a single layer of material after the secondary backing layer 16 has penetrated the primary layer 12.

The secondary backing layer 16 may preferably be polyethylene (e.g., linear low density polyethylene (LLDPE), low density polyethylene (LDPE), medium density polyethylene (MDPE), high density polyethylene (HDPE)), ethylene vinyl acetate (EVA), polyester, polyolefin, and blends thereof, as well as other polymers capable of meeting the process requirements for extrusion and reheat, including TPO (thermoplastic olefin), TPE (thermoplastic elastomer), and ESI (ethylene styrene interpolymer), and blends thereof. An exemplary secondary backing layer 16 material is a 220 melt index low density polyethylene, such as AT 192, available from AT Polymers, Brampton, Ontario, Canada. The secondary backing layer 16 material may have a melt index range of between about 4 and about 500 melt index. However, lower or higher melt indexes may be used if they meet the process requirements. The secondary layer 16 material may be applied in an amount of between about 5 ounces per square yard and about 14 ounces per square yard.

As will be described below, the carpet backing 18 has a porous structure caused by forcing air through the carpet backing 18 when in a fluid or semi-fluid state. FIG. 2 is an enlarged view of a portion of the carpet 10 of FIG. 1 that illustrates air channels 20 that have been created through the carpet backing 18. Air channel formation originates from holes created by the tufts 14 in the primary layer 12 (FIG. 1). Thus, the greater the tuft density, the greater the number of air channels 20 that can be created and, thus, the greater the porosity of the carpet backing 18. Air channels 20 extend through the carpet backing 18 and terminate at respective apertures 20a, 20b in the respective sides 18a, 18b of the carpet backing 18. Other methods of providing porosity in heated carpet backing may be utilized as well, such as forced air (or other fluids) flow via fans, nozzles, etc. Embodiments of the present invention are not limited to subjecting the heated carpet backing to vacuum or the use of air to cause porosity.

Figure 3:
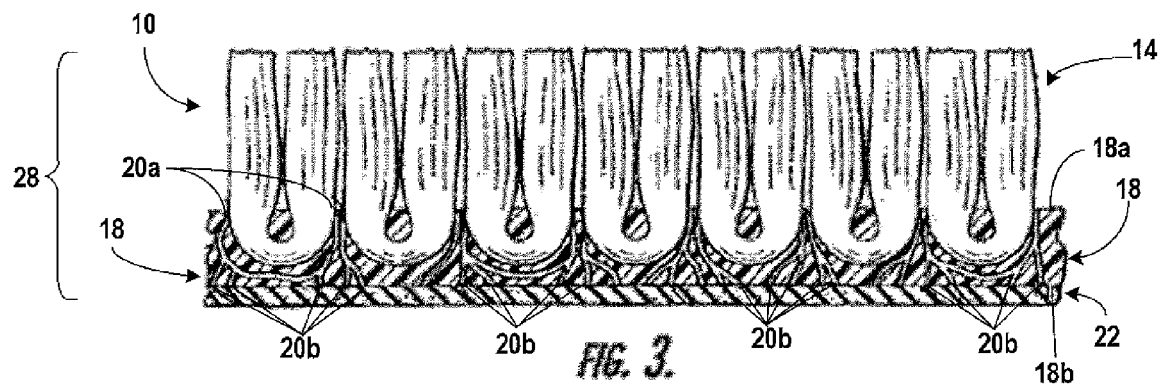
FIG. 3 illustrates the porous tufted carpet of FIG. 2 with a porous thermoformable layer attached to the carpet backing to form a first composite.

According to embodiments of the present invention, a layer 22 of primary porous thermoformable material may be attached to the carpet backing 18, as illustrated in FIG. 3 to form a first composite 28. The layer 22 may preferably have a porous configuration and may be configured to hold the porous carpet backing 18, having air channels 20 formed therein, open such that air can flow therethrough. The addition of layer 22 provides a thicker cross section that allows more area for the polyethylene coating. The more area/polyethylene, the stiffer the composite can be while maintaining porosity. In addition, the layer 22 can provide additional mechanical strength to the carpet backing 18. The layer 22 is configured to be attached to the second composite of the present invention in contacting face-to-face relationship therewith. In one preferred embodiment, the porous thermoformable layer 22 comprised a lightweight spunbonded polyester, Lutradur 7220 form Freudenberg Spunbonded Co., Durham, N.C. having a basis weight of 20 grams per square foot. The porous thermoformable layer 22 may optionally be a sound reducing layer 22 that may be of any composition, but is preferably fibrous, including but not limited to, polyester, nylon, shoddy, waste fibers, etc. Optionally, this sound reducing layer 22 may be a felt which is porous and has good sound reducing properties, for instance a 20 oz. per sq. yd. needled waste fiber product, about 0.5 inches in thickness, from the Montgomery N.C. plant of Collins & Aikman, or a 20 oz. per sq. yd. needled product of 50% bicomponent fibers and 50% 6 denier Mad Dog from the Montgomery N.C. plant of Collins & Aikman. Alternatively, the layer may be, for instance, a 27 oz. per sq. yd. shoddy, about 0.375 inches in thickness, such as Maratex® from Janesville-Sachner Group. This sound reducing layer 22 may also comprise a foam having the desired acoustical properties that is adhered to the carpet backing layer to provide sound reduction or act as a barrier. In the case of a pour-in-place foam which is applied directly behind the carpet backing, the foam may penetrate the backing somewhat and function as a barrier. The foam may be open celled, closed celled, in sheet or cast form, attached to or lying behind the carpet backing layer.

Figure 4:
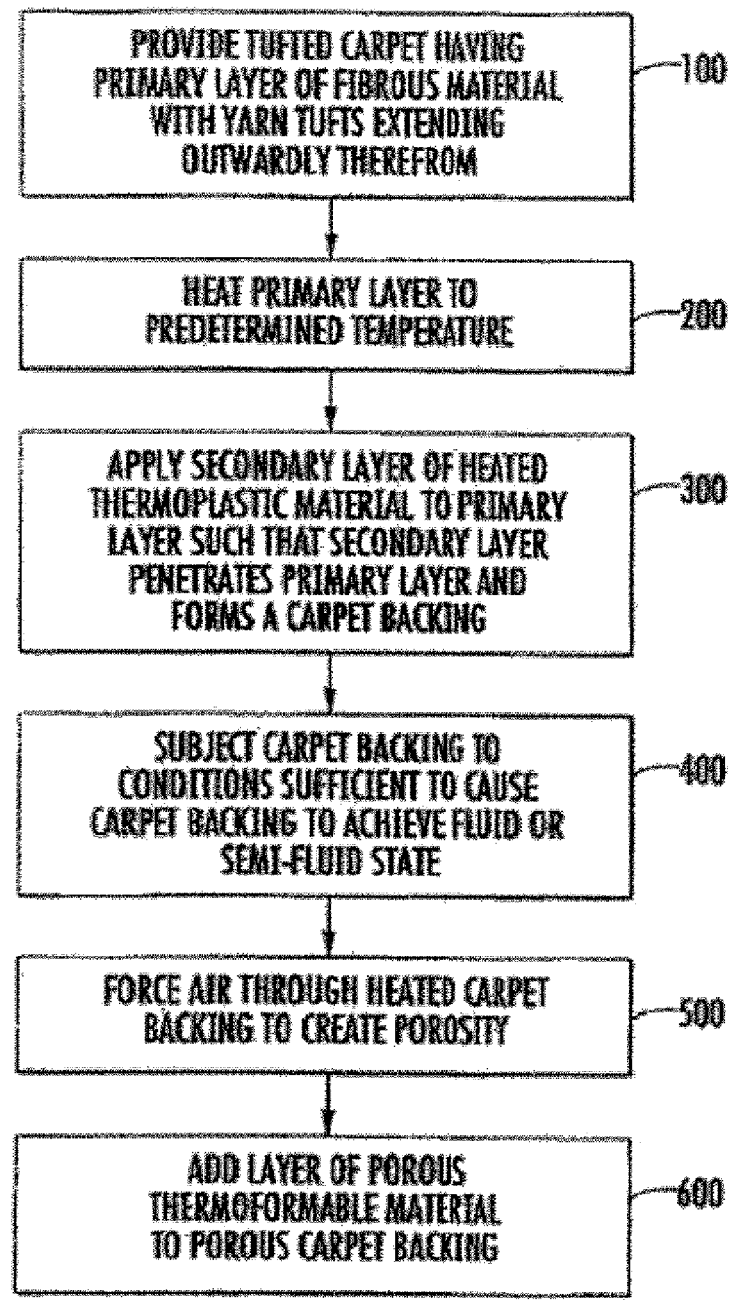
FIG. 4 is a flowchart of operations for producing the first composite according to embodiments of the present invention.

Referring now to FIG. 4, operations for producing the first composite 28, according to embodiments of the present invention, are illustrated. A carpet consisting of a primary layer of fibrous material (e.g., a woven or non-woven matrix of thermoplastic fibers) preferably with yarn tufts extending outwardly from a first side thereof is provided (Block 100). The yarn tufts preferably have a density of between about one-eighth gauge and about one-sixteenth gauge.

The primary layer may be heated to a predetermined temperature (Block 200). An exemplary range is between about 150 degrees F. and about 280 degrees F., and a particularly preferred range is between about 160 degrees F. and about 220 degrees F. However, it is not required that the primary layer be heated.

A secondary layer of thermoplastic material having a temperature of between about 350 degrees F. and about 500 degrees F. is applied (e.g., via extrusion, etc.) to the primary layer second side such that the secondary layer penetrates the primary layer and forms a carpet backing (Block 300). A particularly preferred temperature range for the secondary layer is between about 400 degrees F. and 450 degrees F.

The secondary layer is preferably applied in the amount of between about 5 and 14 ounces per square yard. However, other application ranges may be utilized without limitation. Preferably, the secondary layer penetrates the primary layer by up to about 90% of the thickness of the primary layer. As described above, exemplary thermoplastic materials which may be used as a secondary layer include, but are not limited to, LLDPE, LDPE, MDPE, HDPE, polyester, polyolefin, etc.

The carpet backing is then subjected to conditions sufficient to cause the carpet backing to achieve a fluid or semi-fluid (i.e., flowable) state (Block 400). Thermoplastic materials have a wide range of melt flow rates. High melt flow rate materials typically flow easier and form air channels more easily than low melt flow rate materials. Accordingly, processing temperatures are dependent on materials utilized. The required reheat temperature for subsequent molding of the carpet will be dependent upon the thermoplastic coating material and will vary accordingly. Other ways of causing the carpet backing to achieve a fluid state may include applying microwave, infrared, or other electromagnetic energy to the carpet backing.

Once in a fluid or semi-fluid state, air flow of sufficient flow and velocity is forced through the heated carpet backing to create porosity therein (Block 500). According to embodiments of the present invention, air flow may be provided through the heated carpet backing by subjecting the carpet backing to vacuum. The vacuum causes air to be drawn through the carpet backing thereby creating porosity through the entire carpet backing. Vacuum may range from between about 0 inches of mercury to about 15 inches of mercury, depending on the particular types of material in the carpet backing and depending on the temperature of the carpet backing. Other methods of providing porosity in heated carpet backing may be utilized as well, such as forced air (or other fluids) flow via fans, nozzles, etc. Embodiments of the present are not limited to subjecting the heated carpet backing to vacuum.

According to embodiments of the present invention, a layer of porous thermoformable material may be added to the porous carpet backing to provide improved acoustic performance as well as mechanical strength and/or to control the porosity of the composite (Block 600). According to embodiments of the present invention, the layer of porous thermoformable material may optionally be a sound reducing layer and include fibrous material selected from the group consisting of natural fibers, man-made fibers, waste fibers and blends thereof or may comprise a foam layer, such as polyurethane or polyolefin. The first composite 28 thus comprises a porous thermoformable material and carpet backing which may later be combined with a second sound absorbing/blocking composite 38 to form automotive trim products which generally correspond to the configuration of at least a portion of a vehicle interior and/or trunk, engine or cargo space.

Figure 5:
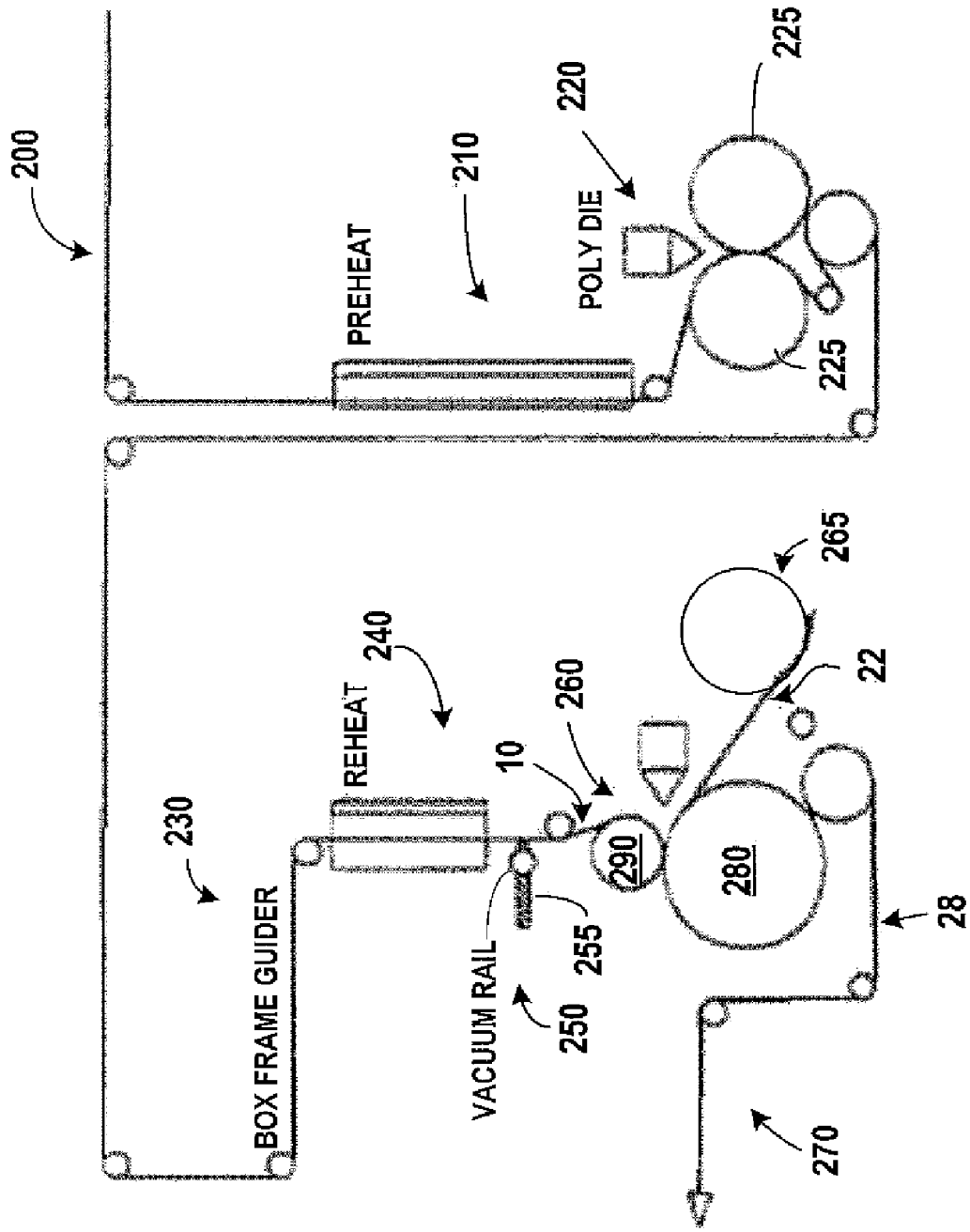
FIG. 5 is a block diagram that illustrates extrusion systems and processes for forming the first composite according to embodiments of the present invention.

The first composite 28 preferably is formed by laminating the porous thermoformable or a sound reducing layer 22 to the carpet backing layer as shown in FIG. 5. FIG. 5 is a block diagram that illustrates extrusion systems and processes for forming the first composite 28 according to embodiments of the present invention. At 200 rolls of tufted carpet 10 (i.e., carpet having a primary layer with a plurality of tufts extending from a side thereof as illustrated in FIG. 1) are joined together (e.g., sewn together, etc.) to facilitate continuous extrusion processing. At 210 the primary surface layer 12 (see FIG. 1) may or may not be heated to achieve the desired result. If heat is required, the typical heat range is between about 150 degrees F. and 280 degrees F., although other temperatures may be utilized.

At 220 a secondary backing layer 16 (see FIG. 1) of thermoplastic material having a temperature of between about 350 degrees F. and about 500 degrees F. is extruded onto the primary layer 12 such that the secondary layer 16 penetrates the primary layer 12 and forms a carpet backing 18 (FIGS. 1–2). Preferably, rolls 225 have a temperature within the range of between about 55 degrees F. and about 120 degrees F. However, the higher the temperature of the rolls 225, the more the secondary layer 16 of thermoplastic material penetrates into the primary layer 12.

At 230 the carpet backing 18 is guided via a box frame guider that is configured to ensure a consistent seal of the carpet backing with a vacuum rail (described below). At 240 the carpet backing 18 is heated to a temperature sufficient to cause the carpet backing 18 to become flowable (i.e., achieve a fluid or semi-fluid state). The temperature required to achieve a fluid/semi-fluid state is dependent on the carpet backing material. A typical heating range is between about 230 degrees F. and about 270 degrees F. Typically, higher temperatures will produce a more porous carpet backing.

At 250 the heated carpet backing passes adjacent to a vacuum rail 255 having a slot therein and which is configured to generate vacuum of between about 0–15 inches of mercury through the slot. A roll 265 of porous thermoformable material 22 or sound reducing material, such as sound reducing felt or like sheet material, has been fed into the process flow such that the layer 22 is laminated to the porous carpet 10 on roll 280 to form a first composite 28. The composite 28 is cooled by passing between cooling rolls 280, 290 and cut into blanks or rolled into roll goods to be used as a feedstock for the subsequent molding process. Alternatively, the composite may be directly fed to a molding line for further processing.

Figure 6:
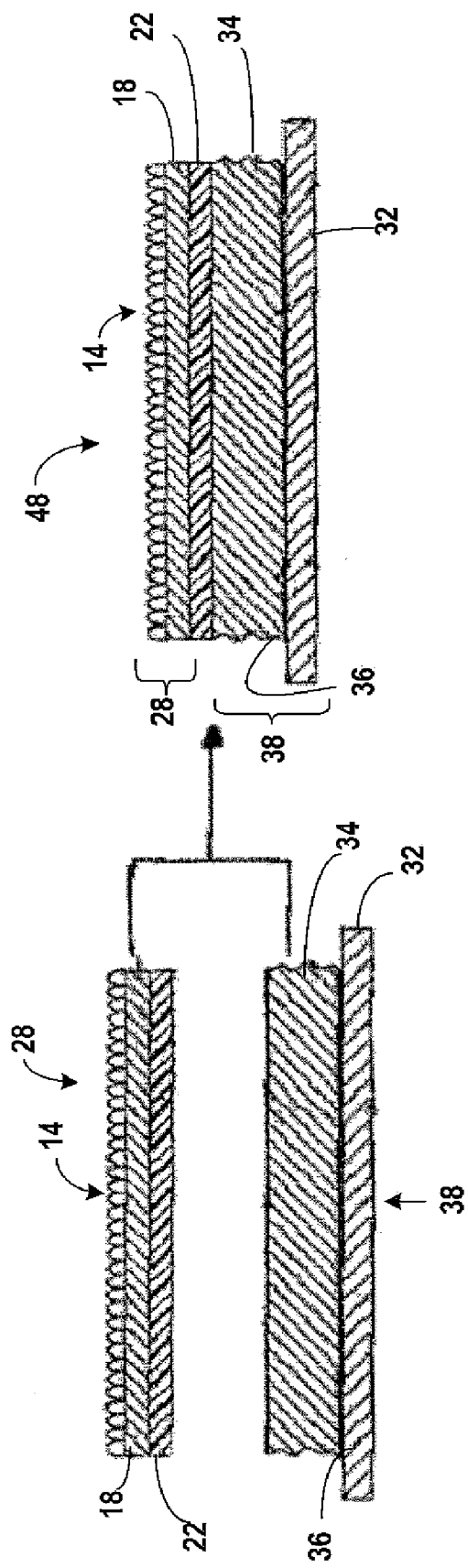
FIG. 6 is a cross-sectional view of a portion of an automotive trim product according to embodiments of the present invention.

In order to provide sound blocking properties for the automotive trim products of the present invention, and to additionally provide sufficient rigidity to the trim products that they may be essentially self-supporting, as required, a second composite 38 comprising a layer or series of layers is provided as shown in FIG. 6. The second composite 38 preferably comprises one or more sound absorbing and/or blocking or barrier layers that will be heated and supplied to a forming mold for compression molding against the first composite layer 28 to form an automotive trim product 48. Exemplary barrier materials 32 which may comprise the second composite 38 include, but are not limited to, a highly filled thermoplastic such as massback (a highly filled ethylene vinyl acetate copolymer such as Keldex® 6705B from Dupont having a basis weight of about 13 ounces per square yard) or filled polymeric compositions as described in U.S. Pat. No. 4,508,771, commonly assigned to the assignee of the present invention and included herein by reference. The massback generally contains a high level of filler such as calcium carbonate, barium sulphate, iron oxide, barium oxide or iron sulphate, included at levels up to about 80% in an EVA, PVC, PE or LDPE polymer.

Alternatively, a thin sheet, for instance about 0.010 to 0.200 inches in thickness, of a preferably semi-rigid thermoplastic composition, including, but not limited to, polyethylene (PE), polypropylene (PP), thermoplastic olefin (TPO), acrylonitrile-butadiene-styrene (ABS), etc. may be used to provide sound blocking and to further provide sufficient stiffness such that when the second composite 38 is joined to the first composite 28 in a molding operation, the resultant trim product 48 is essentially self-supporting and may be used as the show surface in a vehicle.

Preferably, composite 38 may be formed by extruding or laminating a series of materials together to form a sound blocking composite. In one preferred embodiment, composite 38 comprised a sound absorbing layer 34 of Maratex® shoddy from Janesville-Sachner Group supplied in roll form at a basis weight of about 6 ounces per square foot which was extrusion coated with 4 ounces per square yard of a polyethylene precoat 36, such as AT192, a 220 melt index low density polyethylene available from AT Polymers, Brampton, Ontario, Canada. A massback composition 32 was extruded onto the shoddy/precoat layer to form the second composite 38. The massback was Keldex® 6705B from Dupont, applied at a basis weight of 13 ounces per square foot.

Figure 7:
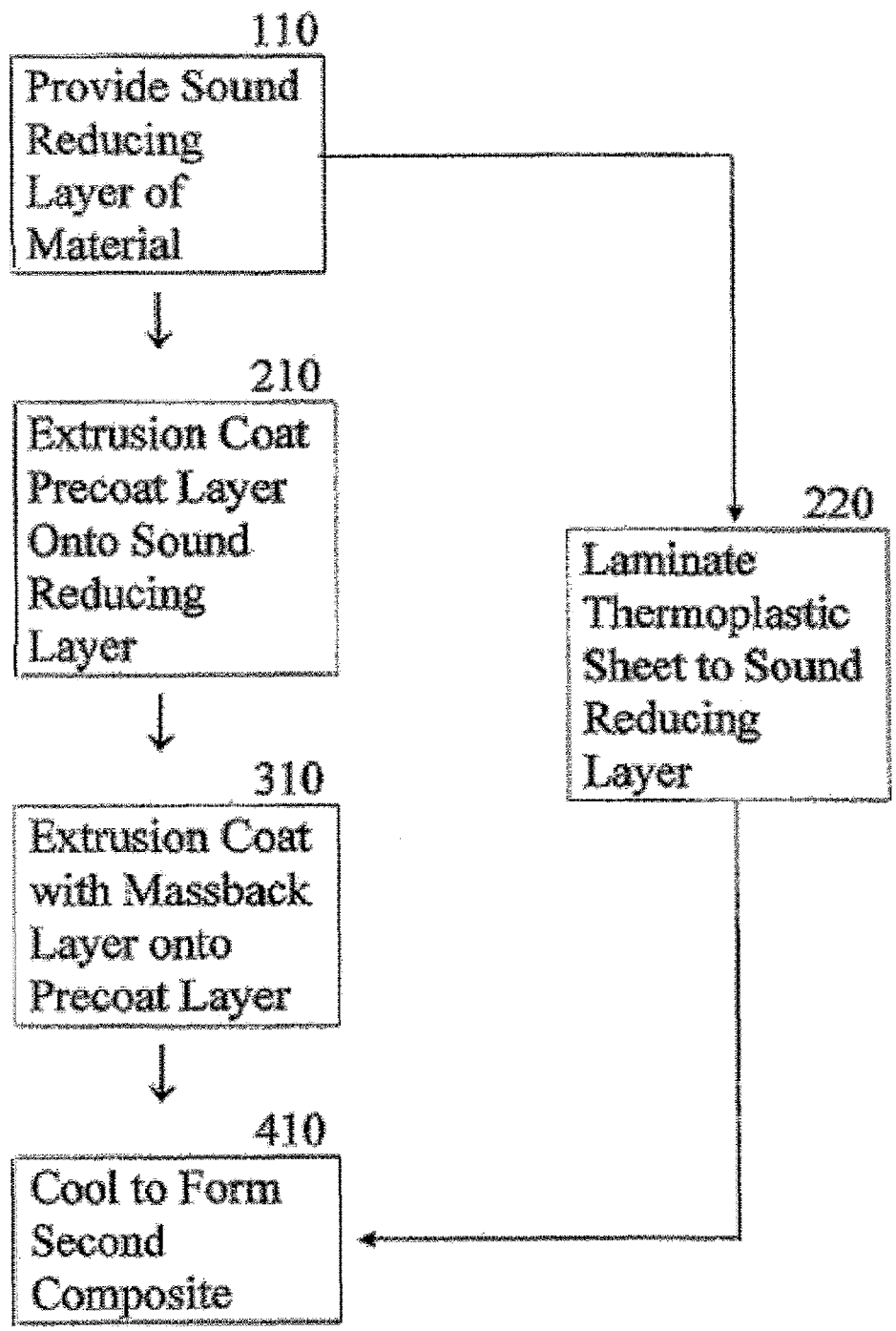
FIG. 7 is a flow chart of operations to produce the second composite according to embodiments of the present invention.

FIG. 7 describes the process to form the second composite 38. A sound absorbing layer is provided at Block 110. The sound absorbing layer 34 may be of any composition, but is preferably fibrous, including but not limited to, polyester, nylon, shoddy, waste fibers, etc. Optionally, this sound absorbing layer 34 may be a felt which is porous and has good sound reducing properties, for instance a 20 oz. per sq. yd. needled waste fiber product, about 0.5 inches in thickness, from the Montgomery N.C. plant of Collins & Aikman, or a 20 oz. per sq. yd. needled product of 50% bicomponent fibers and 50% 6 denier Mad Dog from the Montgomery N.C. plant of Collins & Aikman. This sound absorbing layer 34 may also comprise a foam having the desired acoustical properties to provide sound absorption or act as a barrier. At Block 210 a polyethylene precoat is extrusion coated on to the sound absorbing layer. At Block 310 a massback layer is extrusion coated onto the precoat layer to provide the second composite 38. This composite may then be cut into blanks or rolled into roll goods to be used as a feedstock for the subsequent molding process. Alternatively, the composite may be directly fed to a molding line for further processing. Depending on the composition of the sound absorbing layer and the sound blocking layer, a precoat may not be necessary.

Alternatively, the sound blocking layer may be a thermoplastic sheet (Block 220), such as PE, PP, ABS, etc. which may be extrusion coated on to the sound absorbing layer to form the second composite 38.

In a still further embodiment, the sound absorbing layer 34 and sound blocking layer 32 may be laminated together using an adhesive, as required, to form the second composite 38.

Once the second composite 38 has been provided, it may be heated, preferably in parallel with the earlier described first composite 28, and supplied to a forming mold where the two composites are joined to form an automotive trim product 48. This process is shown in FIG. 8.

As shown in FIG. 8, both composites 28, 38 are provided in sheet or roll form to one or more heating devices for heating and subsequent joining together in a forming mold 50. The first composite 28 is heated, preferably by infrared energy from an infrared heating element 78 directed at the backside of the composite 28 in an oven 80. Other means of heating, including but not limited to, hot air convection, microwave, electromagnetic, etc. may also be used. By directing the energy against the backside of the composite, that is layer 22, the carpet or cloth front side does not become exposed to as great a heat history. The composite 28 is heated sufficiently that it may be formed to shape in a compression mold, preferably to a surface temperature in the range of about 300 degrees F. to about 340 degrees F. At about the same time, the second composite 38 is heated in, preferably, a second oven 84 using a heat source 82 to a temperature suitable for forming the composite 38 to shape by compression molding (e.g. between about 210 degrees F. and 450 degrees F. depending on the composition of the layers 32, 34). The second composite 38 may be heated by any known means, such as hot air, infrared, microwave, etc. to achieve sufficient flexibility to be formed to shape in a compression mold. The heated composites 28, 38 are then transported to a forming mold 50 for forming the composites into the final automotive trim product 48.

The forming mold 50, see FIG. 9, may be comprised of an upper portion 51 and lower portion 52 which cooperate to form a cavity space having the shape of the finished automotive trim product. Additionally, a third layer may be included in the molding process and formed to shape, comprising an underlayment 70. This underlayment layer may act as a decoupler for the product 48 when installed in the vehicle, and preferably comprises a lightweight fibrous layer, such as Marabond®, a thermoplastic bonded low density non-woven manufactured from post industrial synthetic textile fibers and supplied by Janesville-Sackner Group. The underlayment may further be an additional sound reducing layer and may cover a portion of or the entire backside of the second composite 38. As shown in FIG. 9, recessed areas or wells 53 may be provided in the lower mold portion 52 to receive the underlayment 70 if less than full coverage of the backside of the second composite is desired. The underlayment 70 may provide additional sound and/or heat insulation or absorption in selected areas of, say a floor carpet for a vehicle, and may be provided in preformed or die cut shapes that correspond to that area of the vehicle and to the recessed area in the mold 50. The underlayment 70 may include an adhesive layer or powder coat (not shown) which is preferably activatable by heat. The adhesive layer may include, but not be limited to, a powder coating such as Epolene C16 from Eastman Chemical Company, an adhesive web, for instance of polyethylene, a hot melt adhesive or a pressure sensitive adhesive (PSA) film. The underlayment 70 may optionally be attached by mechanical means (e.g. Velcro) or may be of foam construction which may be poured-in-place on the back of the second composite after the product 48 has been formed to final shape. As shown in FIG. 9, preferably the underlayment 70 is loaded into the mold lower portion 52 with the adhesive coated side facing outward, then the heated second composite 38 is loaded into the mold with the sound absorbing layer 34 facing outward. Finally, the heated first composite 28 is loaded into the mold 50 with the tufted carpet side facing outward. Upon closing the mold 50 the adhesive layers (precoat, etc.) or other attachment method preferably bonds or fastens the first 28 and second 38 composites and underlayment layer together. The heat from the composites 28, 38 activates the adhesive or precoat layers, and the pressure of the closed mold 50 forms the composites into the desired shape. Upon sufficient cooling, the product 48 is removed from the mold 50 and trimmed, ready for shipment to as customer.

Referring now to FIG. 6, a cross-sectional view of a portion of the automotive trim product 48, according to embodiments of the present invention, is illustrated. The automotive trim product 48 includes a porous carpet layer 18 bonded to a porous thermoformable layer 22 as described above to form a first composite 28. The illustrated carpet layer 18 preferably includes carpet tufts 14 extending from the surface of the carpet layer, although nonwoven or woven carpet may also be used. The porous carpet layer is in contacting face-to-face relationship with the porous thermoformable layer 22. As described herein, the porous thermoformable layer 22 preferably covers the entire backside of the porous carpet backing 18, however, this invention need not be limited in that manner as the layer 22 may cover less than the full backside of the carpet backing layer 18. The layer 22 may optionally comprise a sound reducing layer of either foam or fibrous construction.

A second composite 38 is attached to the first composite 28 in contacting face-to-face relationship therewith. As shown, the second composite 38 may comprise one or more sound absorbing layers 34 and sound blocking or barrier layers 32.

The sound absorbing layer 34 may be formed from any type of material including, but not limited to, foam (e.g., polyurethane foam, thermoplastic foam, etc.), Marabond®, Maratex®, polyester fibers, and cotton shoddy. The sound blocking layer 32 is preferably a highly filled polymeric layer such as massback, but may alternately be a semirigid thermoplastic, such as polyethylene, polypropylene, ABS, etc. Further, although described herein as a full second composite 38, the second composite 38 may form a partial backing layer behind a portion of the first composite 28, as required by the specific vehicle application.

An exemplary automotive trim product 48 is illustrated in FIG. 10. The illustrated carpet assembly 48 has a non-planar three dimensional molded configuration adapted to fit the front seat compartment floor of a vehicle and includes a raised medial portion 61 adapted to conform to the transmission hump, generally vertically extending side portions 62 adapted to fit beneath each door opening, and a front portion 63 adapted to fit along the inclined floorboard and vertical firewall areas of a vehicle. Various openings or cut-outs are provided, as indicated at 64, to receive air conditioning equipment, the steering column, pedals and the like. It is to be understood that the particular three dimensional configuration illustrated is merely for purposes of illustration. Automotive trim products, according to embodiments of the present invention, may have various configurations and shapes depending on the specific application in various areas of a vehicle, such as the trunk, cargo space, engine compartment, interior, etc.

Referring to FIG. 11, a perspective view of the backside of the automotive trim product of FIG. 10 is shown, illustrating the placement of underlayment 70 added to selected portions of the second composite 38 to form the trim product 48. The underlayment 70 may be preformed to shape, preferably die cut, and match the shape of corresponding recesses in the matching vehicle structure to provide a smooth outer surface for the trim product 48 when it is mounted to the vehicle.

An automotive trim product preferably comprising first composite 28 bonded to a sound absorbing layer 34 and a sound blocking layer 32, with optionally an underlayment attached, according to embodiments of the present invention, can provide local tuning of both product geometry and sound attenuation as well as provide a self-supporting product that may find use in various areas of a vehicle. For example, sound generated within a vehicle can be reduced by the product to provide a quieter environment within the vehicle. An automotive trim product formed in accordance with embodiments of the present invention may achieve between about 150 Rayls and about 10,000 Rayls of sound attenuation, and all increments therebetween, depending upon the composition of the various layers used. The addition of the sound blocking layer improves upon this further in any selected location of the assembly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A method of forming a sound absorbing/sound blocking product, comprising:

providing a first composite; wherein said first composite is formed by providing a primary layer of fibrous material having opposite first and second sides and a thickness and yarn tufts that extend from the first side, providing a secondary layer of thermoplastic material, applying the secondary layer of thermoplastic material at a temperature such that the secondary layer penetrates the primary layer and forms a fibrous layer backing, subjecting the carpet backing to conditions sufficient to cause the carpet backing to achieve a fluid state, and subjecting the carpet backing to air flow sufficient to create a porous carpet backing, providing a thermoformable porous layer, and applying said thermoformable porous layer to said fibrous layer backing;

providing a second composite; wherein said second composite is formed by providing a sound absorbing layer and a sound blocking layer, and heating said first composite and said second composite and bonding said first composite to said second composite.

2. The method of claim 1 further including forming first composite and said second composite into an automotive trim product.

3. The method of claim 1 wherein said step of heating the first composite and second composite comprises heating said first and second composite, contacting said first and second composite and bonding said first composite to said second composite.

4. The method of claim 1 wherein said step of forming the second composite comprises applying a precoat layer to said sound absorbing layer and applying said sound blocking layer to said precoat layer.

5. The method of claim 1, wherein the automotive trim product further comprises providing an underlayment layer located at least against selected areas of the second composite in the forming mold.

6. The method of claim 5, wherein the underlayment layer may be a sound reducing layer.

7. The method of claim 1, wherein the sound absorbing layer may comprise any one or a combination of foam and a fibrous layer.

8. The method of claim 7, wherein the foam may be poured-in-place.

9. The method of claim 1, wherein said sound blocking layer comprises a filled polymer.

10. The method of claim 1, wherein said sound blocking layer comprises a thermoplastic polymer.

11. The method of claim 1, wherein the primary layer of fibrous material comprises a matrix of thermoplastic fibers.

12. The method of claim 11, wherein the matrix comprises a woven matrix of thermoplastic fibers.

13. The method of claim 12, wherein the matrix comprises a non-woven matrix of thermoplastic fibers.

14. The method of claim 1, wherein the step of applying a secondary layer of thermoplastic material at a temperature such that the secondary layer penetrates the primary layer and forms a fibrous layer backing comprises heating the secondary layer.

15. The method of claim 1, wherein subjecting the carpet backing to conditions sufficient to cause the carpet backing to achieve a fluid state comprises forming a fluid state in said fibrous layer backing by heating the carpet backing.

16. The method of claim 1, wherein the secondary layer of thermoplastic material comprises one of polyethylene, ethylene vinyl acetate (EVA), and blends thereof.

17. The method of claim 1, wherein the secondary layer of thermoplastic material penetrates the primary layer of fibrous material up to about 90% of a thickness of the primary layer.

18. The method of claim 1, wherein subjecting the fibrous layer backing to air flow comprises subjecting the fibrous layer backing to vacuum in a range of between about 0 inches of mercury and about 15 inches of mercury.

19. The method of claim 7, wherein the sound absorbing layer comprises fibrous material selected from any one of a natural fiber, synthetic fiber, recycled fiber and blends thereof.

20. The method of claim 19, wherein the fibrous material comprises felt.

21. A method of forming a trim product, comprising: providing a first composite, a second composite and an underlayment;

wherein said first composite is formed by providing a primary layer of fibrous material having opposite first and second sides and yarn tufts that extend from the first side, applying a secondary layer of thermoplastic material at a temperature such that the secondary layer penetrates the primary layer and forms a fibrous layer backing, subjecting the carpet backing to conditions sufficient to cause the carpet backing to achieve a fluid state, and subjecting the carpet backing to air flow sufficient to create a porous carpet backing, providing a porous thermoformable layer, and applying said porous thermoformable layer to said fibrous layer backing;

wherein said second composite is formed by providing a sound absorbing layer and a sound blocking layer, and contacting said sound blocking layer to said sound absorbing layer;

placing said sound absorbing layer against said porous thermoformable layer;

placing said underlayment against said sound blocking layer; and forming said first composite, said second composite and said underlayment into a trim product.

22. The method of claim 21, wherein the step of forming includes heating one or both of said first and said second composites.

* * * * *